US012596292B2

(12) United States Patent
Park et al.

(10) Patent No.: US 12,596,292 B2
(45) Date of Patent: Apr. 7, 2026

(54) ZOOM DRIVING ACTUATOR AND POSITION CONTROL METHOD FOR ZOOM DRIVING

(71) Applicant: JAHWA electronics Co., Ltd., Cheongju-si (KR)

(72) Inventors: Chul Soon Park, Cheongju-si (KR); In Su Kang, Cheongju-si (KR); Je Seung Yeon, Cheongju-si (KR); Byung Cheol Lee, Jinju-si (KR); Hyeon Ik Cho, Daegu (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 36 days.

(21) Appl. No.: 18/915,354

(22) Filed: Oct. 15, 2024

(65) Prior Publication Data

US 2025/0036009 A1 Jan. 30, 2025

Related U.S. Application Data

(63) Continuation of application No. 18/041,739, filed as application No. PCT/KR2021/012257 on Sep. 9, 2021, now Pat. No. 12,242,168.

(30) Foreign Application Priority Data

Sep. 28, 2020 (KR) ........................ 10-2020-0125428

(51) Int. Cl.
*G03B 13/36* (2021.01)

(52) U.S. Cl.
CPC ...... *G03B 13/36* (2013.01); *G03B 2205/0069* (2013.01)

(58) Field of Classification Search
CPC ........ H04N 23/54; H04N 23/51; H04N 23/55; G03B 5/00; G03B 30/00; G03B 3/10; G03B 2205/0046; G03B 2205/0007; G03B 2205/0069; G03B 13/36; G02B 13/009; G02B 13/0065; G02B 7/102
See application file for complete search history.

(56) References Cited

U.S. PATENT DOCUMENTS

2021/0092264 A1* 3/2021 Kang ..................... G03B 13/36

* cited by examiner

*Primary Examiner* — Xi Wang
(74) *Attorney, Agent, or Firm* — ZION IP; Byungwoong Park

(57) ABSTRACT

Disclosed herein is an actuator for driving zoom lenses, where the zoom actuator comprises a first carrier having attached thereto a first lens and movable along an optical axis; a second carrier having attached thereto a second lens and being capable of moving along the optical axis and running anterior or posterior to the first carrier; a housing enclosing the first and second carriers; a first magnet attached to the first carrier; a second magnet attached to the second carrier; a first coil unit mounted to the housing and facing the first magnet; a second coil unit mounted to the housing and facing the second magnet; and a plurality of balls; with at least one of said plurality of balls positioned between the housing and the first carrier; and at least one of said plurality of balls positioned between the housing and the second carrier.

4 Claims, 9 Drawing Sheets

ZOOM DRIVING ACTUATOR AND POSITION CONTROL METHOD FOR ZOOM DRIVING

CROSS-REFERENCE TO RELATED APPLICATIONS

This application is a continuation of U.S. patent application Ser. No. 18/041,739, filed on Feb. 13, 2023, which is a National Stage Entry of PCT/KR2021/012257, filed on Sep. 9, 2021, which claims priority from Korean Patent Application No. 10-2020-0125428, filed on Sep. 28, 2020, the disclosures of the aforementioned applications are hereby incorporated by reference in their entireties.

TECHNICAL FIELD

The present disclosure relates to a zoom actuator and a method for positional control. More particularly, the present disclosure relates to inter alia, an actuator capable of driving lenses over extended strokes with improved precision.

BACKGROUND ART

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

Recent years have seen actuators for zoom lens that supports variable adjustment features including the object size by tuning the focal length through such functions as zoom-in and zoom-out. In certain models of actuators, further diversification in implementing zoom has been attainable through combinations in the relative positions among plural lenses (lens assembly).

Since zoom lenses have longer or extended distances of movement along the optical axis (also referred to as stroke) than ordinary lenses, the actuators used for driving zoom lens must accordingly be designed to exert sufficient driving force. Furthermore, their design should enable accurate detection and feedback control of the corresponding position of the zoom lenses across the entire stroke range.

Actuators known in the art, however, had an element for driving carriers simply installed in multiple numbers, but independent of one another. Thus, although they were capable of functions based on relative positioning of the lenses such as zooming and auto-focusing, their abilities were lacking in precisely detecting the position of the carrier (lens) of interest and utilizing such information for feedback control across the extended moving distances, limited by their reliance on conventional application of Hall sensors.

In addition, although art-known actuators met with some degree of success in fortifying the driving force by placing magnets at both ends of the carrier, this approach led to inflated actuator dimensions because room for movement has to be set aside for each carrier in designing actuator space. Accordingly, there were big obstacles in the use of prior art actuators in applications such as smart phones where size or volume was a significant issue.

In addition, prior art actuators were incapable of precisely controlling the driving of individual carriers, especially in such intervals where multiple carriers were in proximity. Prior art actuators were configured to comprise plural number of carriers, each with a magnet attached, which in turn was disposed to face a coil for generating electromagentic force in that magnet. This setup caused magnetic interference generated from the interaction with the other coil or the other magnet, posing another unsolved technical problem.

SUMMARY

The present disclosure has been contemplated to solve the aforementioned problems of the related art in the context mentioned above. It is a technical goal of the present invention to achieve a more effective utilization of space for the actuator. It is another technical goal to provide a zoom actuator capable of accurately detecting position over an extended stroke range leading to an improved precision in zoom driving by means of a plurality of interactive Hall sensors.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

To achieve the technical goals mentioned above, in one aspect of the present disclosure is provided a zoom actuator which comprises a first carrier having a first lens attached thereto and movable along an optical axis; a second carrier having a second lens attached thereto with the second carrier being capable of moving along the optical axis and running anterior or posterior to the first carrier; a housing to enclose the first and second carriers; a first magnet attached to the first carrier; a second magnet attached to the second carrier; a first coil unit mounted to the housing and facing the first magnet; a second coil unit and mounted to the housing and facing the second magnet; and a plurality of balls, in which at least one of said plurality of balls is positioned between the housing and the first carrier and at least one of said plurality of balls is positioned between the housing and the second carrier.

In a particular embodiment, the first carrier comprises a first mount equipped with the first lens; a first support provided on the first mount either to its left or right, with said first support extending longer along the optical axis than the first mount. Similarly, the second carrier comprises a second mount equipped with the second lens; and a second support provided on a side of the second mount, either to the left or right thereof, but opposite the side the first support is provided thereon, said second support extending longer than the second mount in a direction opposite to the first carrier along the optical axis.

In a preferable embodiment, the first or second coil unit consists of n coils (n being a natural number equal to or greater than 2) placed anterior or posterior relative to each other along the optical axis. In such case, the first or second magnet consists of $n+1$ magnetic poles facing respectively, the first coil unit or the second coil unit.

In addition, the first carrier of the present disclosure may further comprise a first rail formed on the first support; and a second rail formed on a region of the first mount the first support being absent thereon, while the second carrier may further comprise a third rail formed on the second support; and a fourth rail formed on a region of the second mount the second support being absent thereon.

In such case, the housing of the present disclosure may comprise a first guide rail formed of plural individual rails and facing the first rail; a third guide rail, formed of plural individual rails and facing the third rail; a second guide rail and a fourth guide rail; each of the second and fourth guide rails facing respectively, the second and fourth rail, wherein one of the plurality of balls may be interposed per each space that spans from each of the first to fourth rails to each of the respective first to fourth guide rails.

Furthermore, in a preferable embodiment, each of the first to fourth guide rails is aligned parallel to the optical axis, in which case the first guide rail is formed on one side of the housing either to the left or right, and the third guide rail is formed on the other side of the housing where first guide rail was not provided on, and the second guide rail is formed on the inner side of the third guide rail, and the fourth guide rail is formed on the inner side of the first guide rail.

Preferably, the zoom actuator of the present disclosure further comprises a plurality of Hall sensors disposed along the optical axis at positions differing in their distances displaced from the interpolar boundary of the first magnet.

In this particular embodiment, the plurality of Hall sensors of the present disclosure is preferably arranged on a line running parallel to the optical axis, with the Hall sensors disposed either anterior or posterior to one another with respect to the optical axis.

In a further embodiment, the first magnet of the present disclosure may consist of m magnetic poles (m being a natural number equal to or greater than 3) facing the first coil unit, in which case the plurality of Hall sensors is preferably configured to face together the same pole out of the m magnetic poles when the first carrier is at the default position.

Another aspect of the present disclosure is a method for positional control of a zoom actuator in which the zoom actuator comprises a first carrier with a first lens and a first magnet attached to it and capable of moving along an optical axis, a second carrier with a second lens and a second magnet attached to it and capable of moving along the optical axis running anterior or posterior to the first carrier, a first coil unit facing the first magnet, a second coil unit facing the second magnet, and a plurality of Hall sensors facing the first magnet. In this method are comprised the steps of: a signal input step for receiving an output signal from each of the plurality of Hall sensors; a position signal generating step for generating the position signal for the first carrier by carrying out operations on the output signals; and a positional control step for controlling the position of the first carrier using the position signal. In such case, the plurality of Hall sensors is disposed along the optical axis at positions differing in their distances displaced from the interpolar boundary of the first magnet.

More preferably, the first magnet may be configured to have m magnetic poles (m being a natural number equal to or greater than 3) facing the first coil, in which case, upon the first carrier being at the default position, the position signal generating step carries out on the position signals, either additive operation when the plurality of Hall sensors is facing together the same magnetic pole of the first magnet, or a subtractive operation when each of the plurality of Hall sensors is facing a different magnetic pole of the first magnet.

According to a preferred embodiment of the present disclosure, a physical arrangement of plural carriers in symmetrically opposing directions not only affords sufficient scope for independent movement for each lens (lens assembly) attached to each carrier, but also enables implementing the entire device in a spatially more compact structure and shape, providing a device design optimal for minimizing the overall space and thereby slimming the mobile terminal.

According to a preferred embodiment of the present disclosure, space for harnessing the magnet is provided in such way that the carriers are asymmetrically arranged with reference to the lens attachment to allow each carrier to mount a magnet of a sufficient size, effectively fortifying the driving force.

According to another embodiment of the present disclosure, complete separation of the magnet and the coil, which together generate the driving force for each carrier, into one side and the other is achieved so as to prevent the magnetic force lines driving the individual carriers from interfering with one another across the entire stroke range, leading to more defined and precise driving performance.

Furthermore, in accordance with the present disclosure, improved precision is attainable in detecting the position of each lens-mounted carrier in motion as well as the subsequent feedback control of the position by configuring the magnets in a form with 3 exposed magnetic poles or more and arranging a plurality of Hall sensors anterior to posterior along the optical axis so that each Hall sensor has varied displacement from the interpolar boundary of the magnet.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
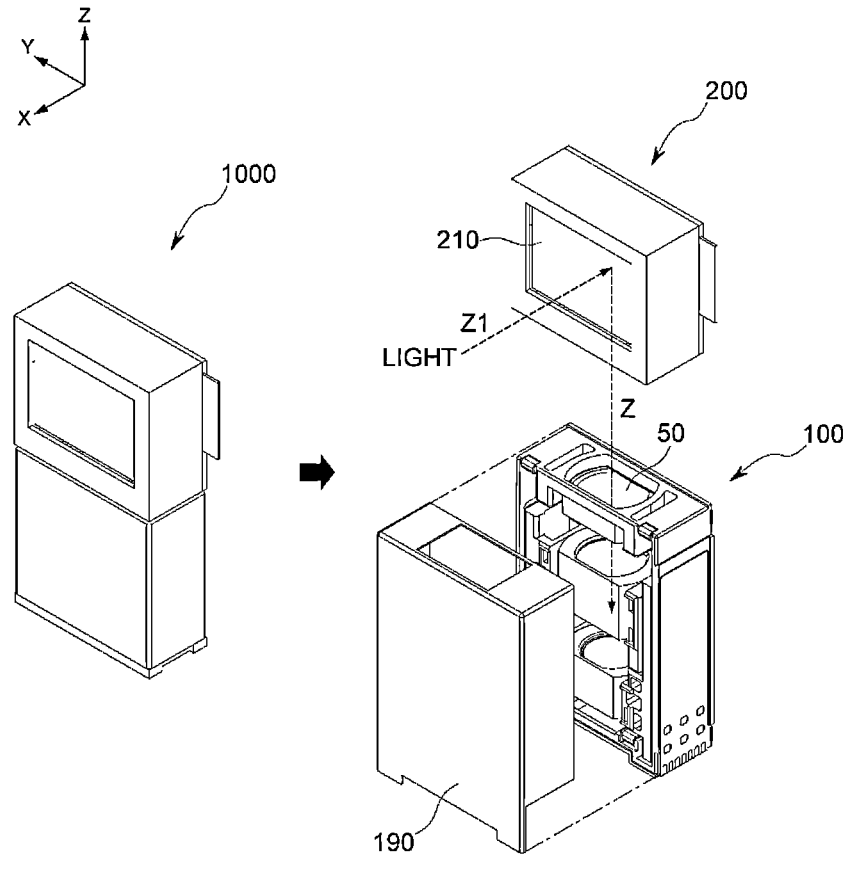
FIG. 1 is a diagram depicting the overall configuration of a zoom drive actuator and a camera module in accordance with a preferred embodiment of the present invention.

FIG. 1 depicts the overall configuration of a zoom drive actuator (hereinafter referred to simply as "actuator") (100) and a camera module (1000) in accordance with a preferred embodiment of the present invention.

The actuator (100) of the present invention can be embodied along with such other parts as a reflectometer module (200) as part of a camera module (1000) as illustrated in FIG. 1, not to mention as a single stand-alone device.

As will be described in detail below, the actuator (100) of the present invention is for carrying out autofocusing or zooming by moving in a linear motion each of a plurality of carriers to which the lens (lens assembly) is attached along the optical axis.

The reflectometer module (200), which can be set up anterior to (along the optical axis) the actuator (100) of the present invention, reflects or refracts the optical path (Z1) of the object towards a path in the direction of the lens (Z). The light thus reflected or refracted towards the optical axis passes the lens (lens assembly) mounted on the carrier and enters the image sensor such as complementary metal oxide semiconductor (CMOS) and charge coupled device (CCD).

The reflectometer module (200) for modifying the optical path may comprise a reflectometer (210) that consists of one selected from a mirror and a prism or a combination of both. The reflectometer (210) may be comprised of any material capable of modifying the path of the incoming light from the outside toward the optical axis, but for the purpose of high performance optical properties, glass is the preferred medium.

The camera module (1000) of the present invention comprising such elements as the reflectometer module (200) and the like is configured to refract the path of light toward the lens. This allows the entire device to be set up lengthwise along the mobile terminal instead of across the width so as to keep the mobile terminal thin, making it optimal for miniaturization and slimming of mobile terminals.

In certain embodiments, the reflectometer (210) is configured to move in rotational motion by the action of a driving means capable of generating magnetic field such as magnets and coil. Thus, as the reflectometer (210) moves or moves in rotational motion, the light from the object reflected (refracted) by the reflectometer (210) is led along the ±Y-axis and/or ±X-axis to enter the lens and image pick-up element, thereby enabling corrections to camera shake along the X-axis and/or Y-axis.

The light from the object thus reflected by the reflectometer module (200) enters into the first lens (60) and second lens (70) equipped within the actuator (100), and functions such as zooming and autofocusing are performed by the actuator (100) of the present invention making combinatorial adjustments to the positions for each of the first (60) and second (70) lenses along the optical axis.

In certain embodiments, a fixed lens (50) can be set up anterior to the actuator (100) as illustrated in FIG. 1 to enhance optical performances such as actuator (100) zoom ratio.

As described hereinafter, the optical axis (Z-axis) is defined as the axis corresponding to the path of the incoming light, e.g., into the first lens (60) and the two axes spanning a plane perpendicular to the optical axis (Z-axis) are defined as the X-axis and Y-axis.

Figure 2:
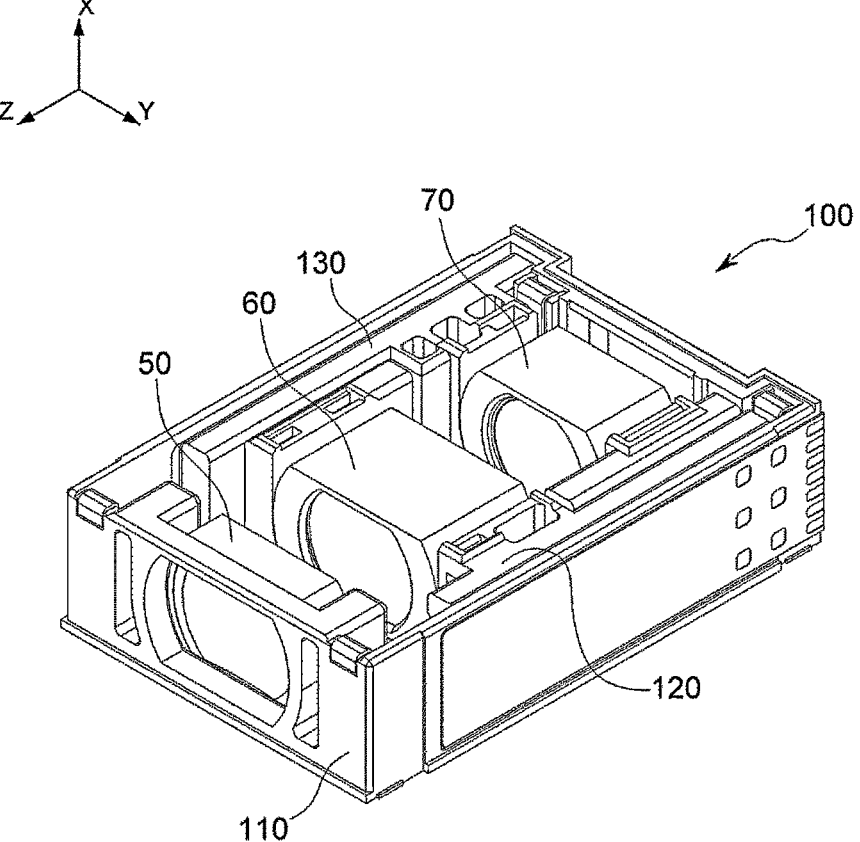
FIG. 2 is a diagram depicting the overall configuration of a zoom drive actuator in accordance with a preferred embodiment of the present invention.

FIG. 2 illustrates the overall configuration of an actuator (100) in accordance with a preferred embodiment of the present invention.

As illustrated in FIG. 2, the actuator (100) of the present invention comprises a housing (110), which amounts to the base frame accommodating the inner parts, a casing (190) attached to the housing (110) and capable of functioning as a shield can, a first carrier (120) and a second carrier (130).

Each of the first carrier (120) with a first lens (60) attached thereto and the second carrier (130) with a second lens (70) attached thereto amounts to a moving body in linear motion along the optical axis (Z-axis), while correspondingly the housing (110) amounts to a fixed body.

In the embodiment illustrated in FIG. 2 and the like, the second carrier (130) is placed posterior to the first carrier (120) along the optical axis and it maintains such arrangement when moving in linear motion along the optical axis.

As will be described below, the first carrier (120) is equipped with a first magnet (M1) and in the housing (110) is equipped a first coil unit (C1) that faces and imparts driving force to the first magnet (M1).

Once power of appropriate magnitude and direction is applied to the first coil unit (C1) by a first operating driver (150A), electromagnetic force is generated between the first coil unit (C1) and the first magnet (M1), and this force generated moves the first carrier (120) back and forth along the optical axis.

Similarly, once a second operating driver (150B) exerts control to apply power of appropriate magnitude and direction to a second coil unit (C2), electromagnetic force generated between the second coil unit (C2) and a second magnet (M2) equipped to the second carrier (130) moves the second carrier (130) linearly along the optical axis.

Although the accompanying figures illustrate a first carrier (120) to which a first lens (60) is attached and a second carrier (130) to which a second lens (70) is attached, this is only one of the possible examples. Needless to say, further numbers of lenses and carriers can be comprised depending on the particular embodiment.

Hereinafter, for the purposes of efficient description, the number of carriers illustrated as being comprised in an actuator (100) will be two in the examples, and in addition, the carrier placed anterior along the optical axis shown in FIG. 2 will be designated as the first carrier (120), while the carrier placed posteriorly as the second carrier (130).

Thus, as each of the first carrier (120) and the second carrier (130) moves linearly along the optical axis, so does each lens attached to each carrier, and through the relative positioning of these lenses, zooming or auto-focusing is implemented. As explained above, a fixed lens (50) can be set up anterior to the first lens (60) in certain embodiments to suit the optical performance or specification of the actuator (100).

Furthermore, balls are preferably placed between the first carrier (120) and the housing (110) and between the second carrier (130) and the housing (110) in order to set the first carrier (120) and the second carrier (130) in smooth linear motion with the least friction.

Figure 3:
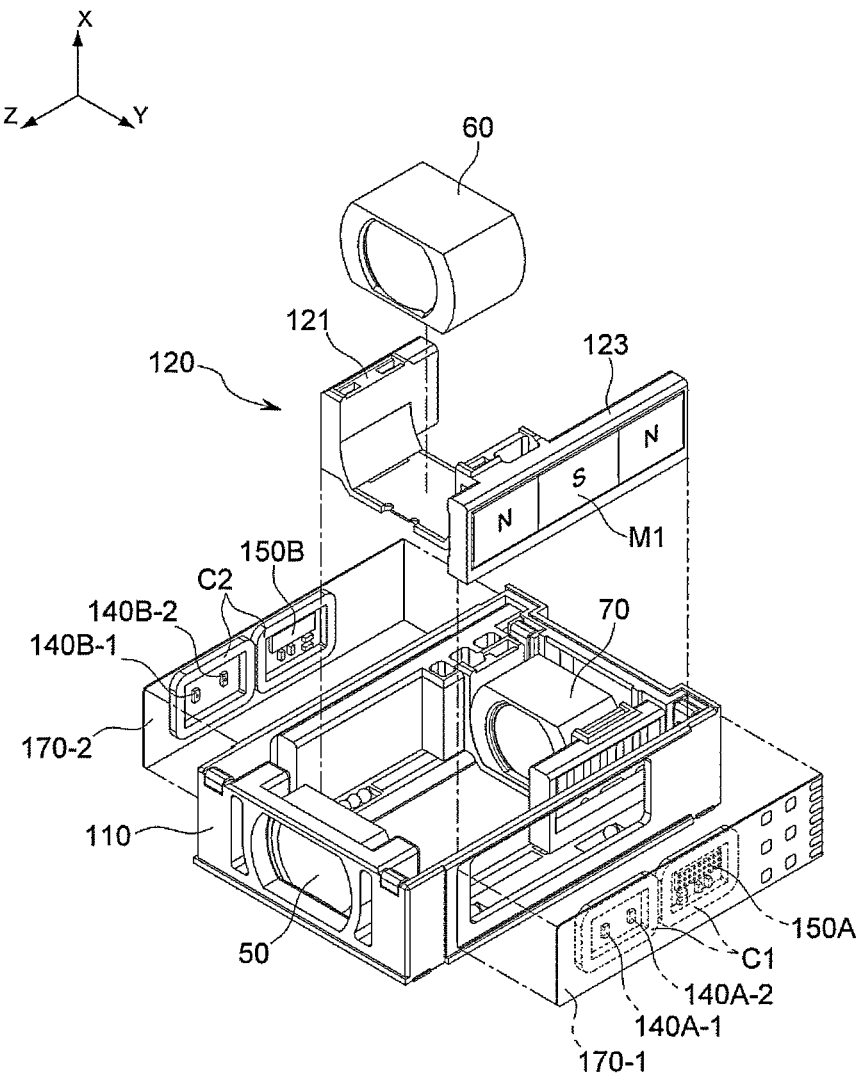
FIG. 3 is a diagram depicting the configuration in detail of the first carrier and the housing according to an embodiment of the present invention.
Figure 4:
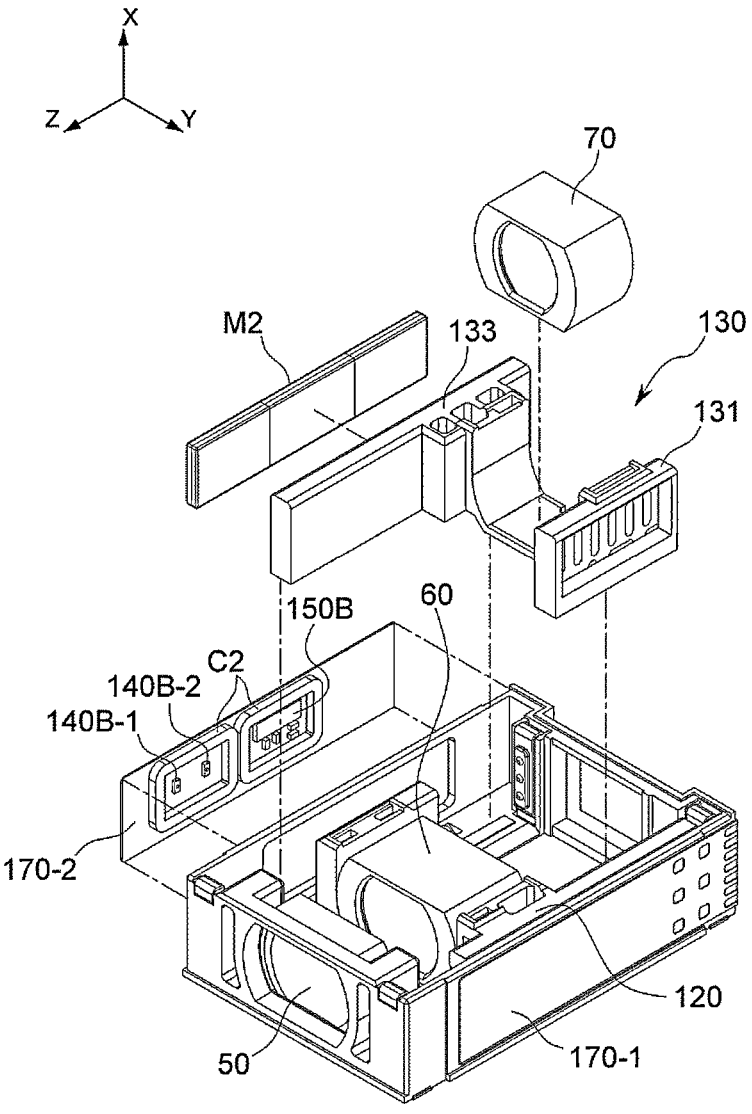
FIG. 4 is a diagram depicting the configuration in detail of the second carrier and the housing according to an embodiment of the present invention.

FIGS. 3 and 4 illustrate a configuration in detail comprising a first carrier (120), a second carrier (130) and a housing (110) in accordance with an embodiment of the present invention.

As described above, the first carrier (120) of the present invention to which the first lens (60) is attached is a moving body in linear motion along the optical axis. More particularly, the first carrier (120) comprises a first mount (121) equipped with the first lens (60) and a first support (123) carrying the first magnet (M1).

The first mount (121) as illustrated in the figures, is shaped match that of the first lens (first lens assembly) (60) so that it can mount the lens. In certain embodiments, a casing (not shown) can be provided to the first mount (121) to prevent the first lens (60) from being dislocated, e.g., along the X-axis.

The first support (123) carrying the first magnet (M1) is provided on the first mount (121) either to its left or right, and extends, as illustrated in the figures, along the optical axis longer than the first mount (121).

The first support (123) may be made integral with the first mount (121), and for the purpose of forming a physical structure symmetric with the second support (133) of the second carrier (130) as will be described later, preferably has a shape extending along one of the optical axes (Z-axis).

Since the first support (123) of the present invention as described to has a shape elongated along the optical axis, it is capable of carrying a first magnet (M1) enlarged in proportion to the extended range while maintaining the overall size of the first carrier (120), which contributes to the strengthening of the driving force.

The first coil unit (C1) mounted to the housing (110), preferably consists of n coils placed anterior or posterior along the optical axis to augment the driving force. It is preferred that the first magnet (M1) is correspondingly configured to have n+1 magnetic poles facing the first coil unit (C1). The n herein is a natural number equal to or larger than two.

As an embodiment, a configuration comprising a first coil unit (M1) consisting of two separate coils and a first magnet (M1) in which three magnetic poles face the first coil unit (C1) is illustrated in FIG. 3.

Setting up the first magnet (M1) with more magnetic poles than the number of separate coils facing them as described above enhances the driving efficiency by sustained transmission of the coil's magnetic force to the magnet as such arrangement keeps the first coil unit (C1) facing two or more magnetic poles even in the movement of the first magnet (M1) when the first carrier (120) moves along the optical axis. It would be obvious that the same arrangement applies to the second magnet (M2) in conjunction with the second coil unit (C2) driving the second carrier (13).

As illustrated in FIG. 3, the first Hall sensor (140A-1) and the second Hall sensor (140A-2) are elements that are mounted on the first circuit board (170-1) together with the first coil unit (C1) and the first operating driver (150A). The sensors, through the Hall effect, detect the magnitude and the direction of magnetic field generated from the first magnet (M1) facing the sensors and generate an output signal corresponding to the field.

The first operating driver (150A) controls the processing of the output signals received from the first (140A-1) and second (140A-2) Hall sensors by carrying out operations on them so that power of a magnitude and direction commensurate with the operational outcome is applied to the first coil unit (C1). The first (140A-1) and second Hall sensors (140A-2) will be described in detail below.

The second carrier (130) has a physical structure commensurate with the first carrier (120) described above, and is formed symmetrically in the opposite direction with respect to the first carrier (120) as shown in the figures.

More particularly, the second carrier (130) comprises a second mount (131) equipped with a second lens (70) and a second support (133) carrying the second magnet (M2).

The second support (133) of the second carrier (130) is provided on a side of the second mount (131), either to its left or right, but opposite the side the first support (123) of the first carrier (120) is provided on. Furthermore, the second support (133) is shaped to extend longer than the second mount (131) in a direction opposite to that of the first support (123) of the first carrier (120) along the optical axis.

The physical structures of the first carrier (120) and the second carrier (130) are thus overall similar. By locating the first mount (121) equipped with the first lens (60) and the second mount (131) equipped with the second lens (70) on the middle part (based on the Y-axis), the carriers are configured to provide sufficient room for moving the first (60) and second lenses (70).

Simultaneously, the first (M1) and second magnets (M2) for driving respectively, the first (120) and second carriers (130) can be provided in larger sizes by means of the first (123) and second (133) supports with the view to effectively enhancing the driving force.

Furthermore, the first (M1) and second magnets (M2) are placed apart from each other, respectively to the left and right (based on the Y-axis). In correspondence, the first (C1) and second coil units (C2), each facing respectively, the first (M1) and second magnets (M2), are accordingly placed apart.

Setting far apart, as described, the first magnet (M1) and the first coil unit (C1) as well as the second magnet (M2) and the second coil unit (C2) from each other allows the inventive actuator to eliminate from the beginning, interference and influence among the electromagnetic force employed for driving each carrier, leading to independent driving of the first (120) and second carriers (130) in more precision.

As illustrated in FIG. 3, the third Hall sensor (140B-1) and the fourth Hall sensor (140-B2) are elements that are mounted on the second circuit board (170-2) together with the second coil unit (C2) and the second operating driver (150B). The sensors, through the Hall effect, detect the magnitude and the direction of magnetic field generated from the second magnet (M2) facing the sensors and generate an output a signal corresponding to the field.

The second operating driver (150B) controls the processing of the output signals received from the third (140B-1) and fourth (140B-2) Hall sensors by carrying out operations on them so that power of a magnitude and direction commensurate with the operational outcome is applied to the second coil unit (C2).

Figure 5:
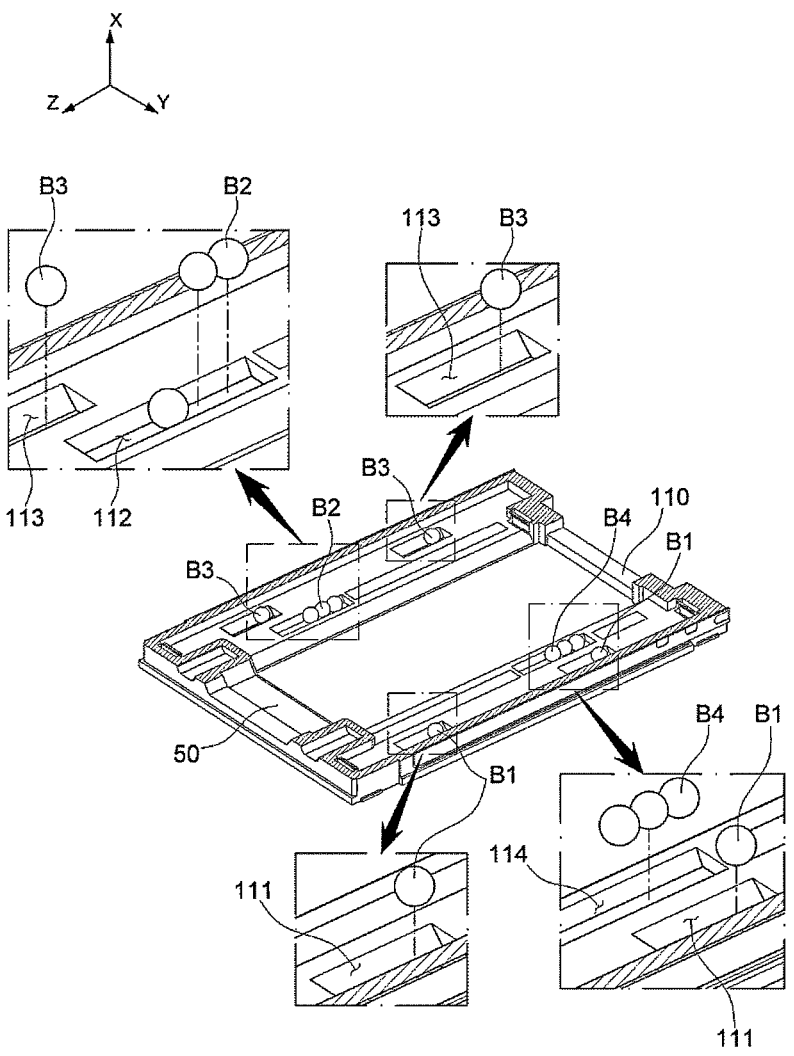
FIG. 5 depicts a guide rail formed on the housing.
Figure 6:
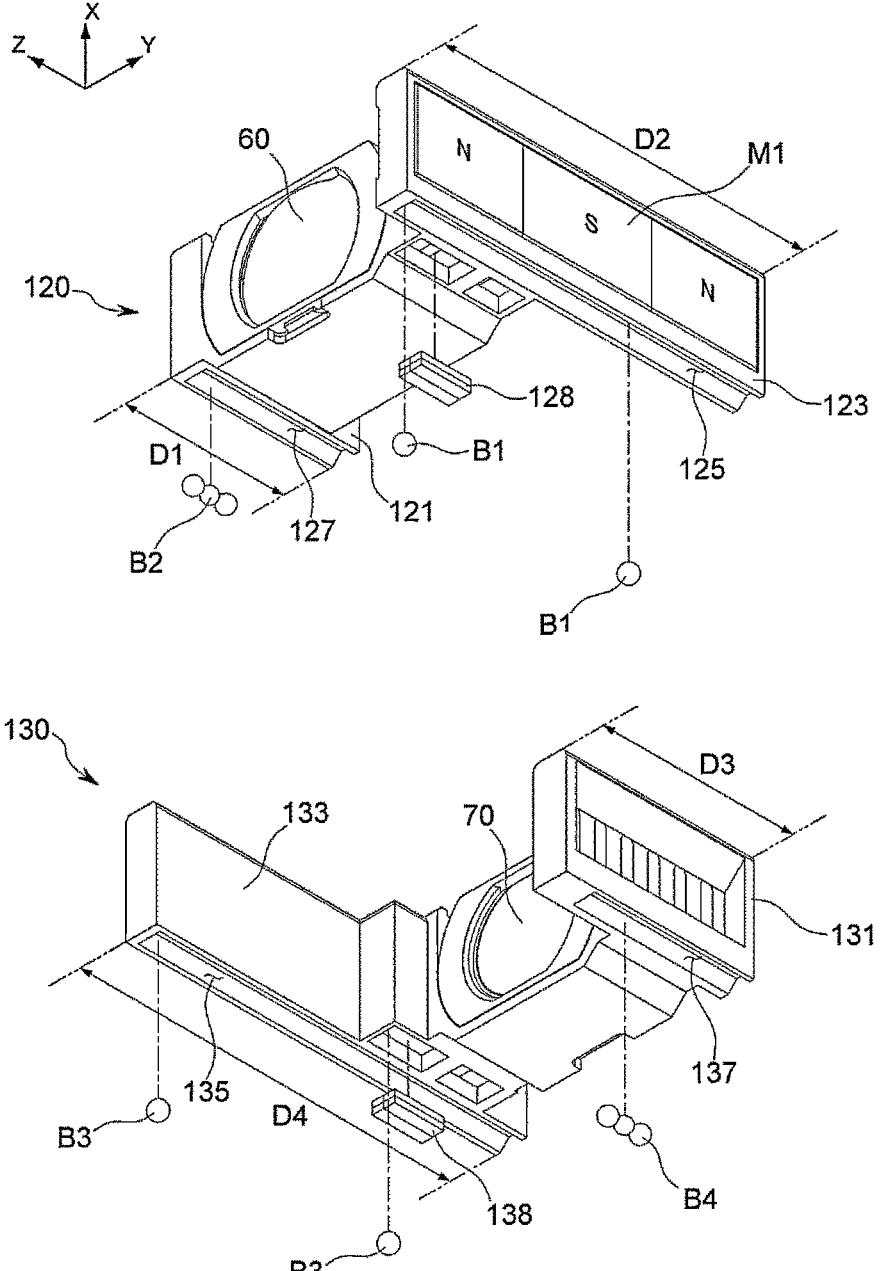
FIG. 6 depicts the configuration of the rails formed on the first and second carriers.

FIG. 5 depicts a guide rail formed on the housing (110), while FIG. 6 depicts the configuration of the rails formed on the first (120) and second carriers (130).

FIG. 5 is a cross-sectional view in the YZ plane exposing the first, second, third and fourth guide rails (111, 112, 113, 114) formed on the bottom floor (based on the X-axis) of the housing (110).

The first guide rail (111) and the second guide rail (112) are configured to guide the balls (B1, B2) interposed between the first carrier (120) and the housing (110). The first guide rail (111) is formed on the external side to the right, based on the Y-axis of FIG. 5, in multiple numbers (preferably two) as illustrated in FIG. 5.

The first guide rail (111) is an element facing the first rail (125) formed on the first support (123) of the first carrier (120) (see FIG. 6). The first guide rail (111) has an overall elongated shape along the optical axis and is preferably implemented in multiple numbers as separate entities. Between the first rail (125) of the first support (123) and each of the separate first guide rails (111), a first ball (B1) is interposed.

As illustrated in FIG. 6, the first carrier (120) comprises a second rail (127) formed on a region of the first mount (121) the first support is not provided (123), and this second rail (127) faces a second guide rail (112) formed on the housing (110).

This second guide rail (112) as illustrated in FIG. 5 is formed on the internal side to the left, based on the Y-axis of FIG. 5. A second ball (B2) is interposed between the second guide rail (112) and the second rail (127).

Through the arrangement in which the dualized first balls (B1) are interposed between the first rail (125) and the first guide rail (111) and the second ball (B2) is interposed between the second rail (127) and the second guide rail (112), the first carrier (120) comes into contact with facing the housing (110) in total three positions.

Such guiding arrangement of the first balls (B1) and the second ball (B2) is in harmony with the physical structure of the first support (123) which has an elongated shape along the optical axis, and provides, as a whole, more stable physical support to the first carrier (120).

As illustrated in FIG. 6, the second carrier (130) of the present invention comprises a third rail (135) formed on the underpart (based on the X-axis) of the second support (133) to which the second magnet (M2) is attached, and a fourth rail (137) formed on the underpart (based on the X-axis) of a region in the second mount (131) where the second support (133) is not equipped.

A third guide rail (113) is an element facing the third rail (135) formed on the second support (133) and has an overall elongated shape along the optical axis and is preferably implemented on the housing (110) in multiple numbers as separate entities so as to be capable of providing stable support as the first guide rail (111).

This third guide rail (113) as illustrated in FIG. 5 is formed on a side further external and further left, based on the Y-axis of FIG. 5, to the second guide rail (112). A fourth guide rail (114) implemented on the housing (110) faces the fourth guide rail (137) of the second carrier (130) and is formed on a side more internal than first guide rail (111).

Through the arrangement in which the dualized third balls (B3) are interposed between the third rail (135) and the third guide rail (113) and the fourth ball (B4) is interposed between the fourth rail (137) and the fourth guide rail (137), the second carrier (130) comes into contact with facing the housing (110) in total three positions.

Such guiding arrangement of the third balls (B3) and the fourth ball (B4) is in harmony with the physical structure of the second support (133) which has an elongated shape along the optical axis, and provides more stable physical support as a whole to the second carrier (130).

As described earlier, both the first (120) and second carriers (130) of the present invention are compartmentalized so as to have one region for attaching the lens and another for attaching the magnet, with the magnet-attachment regions having an extended shape along the optical axis. The first (120) and second carriers (130) themselves are physically configured symmetrically but in opposing directions.

The present invention, as contemplated above, allows the guide rails configurations with extensive reach along the optical axis and this in turn provides an even more effective means to stretch along the optical axis the stroke ranges of the first (120) and second (130) carriers free of interference or physical disturbance.

To implement an effective guiding towards linearity in path, it is preferred that at least one or more of the rails (125, 127, 135, 137) and/or guide rails (111, 112, 113, 114) accommodate some of the balls (B1, B2, B3, B4).

Figure 7:
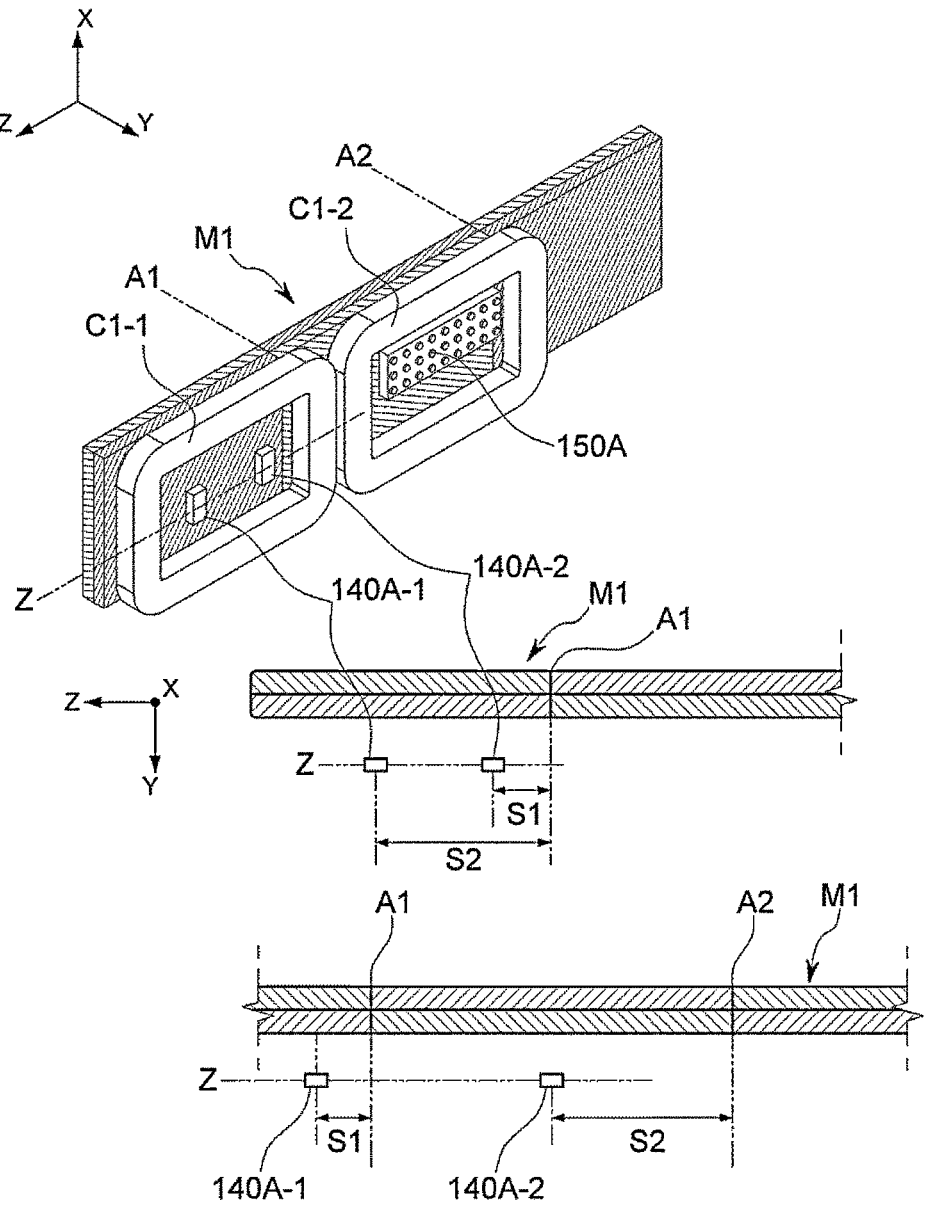
FIG. 7 illustrates the positional relationship between the plurality of Hall sensors and the magnet in accordance with the present invention.
Figure 8:
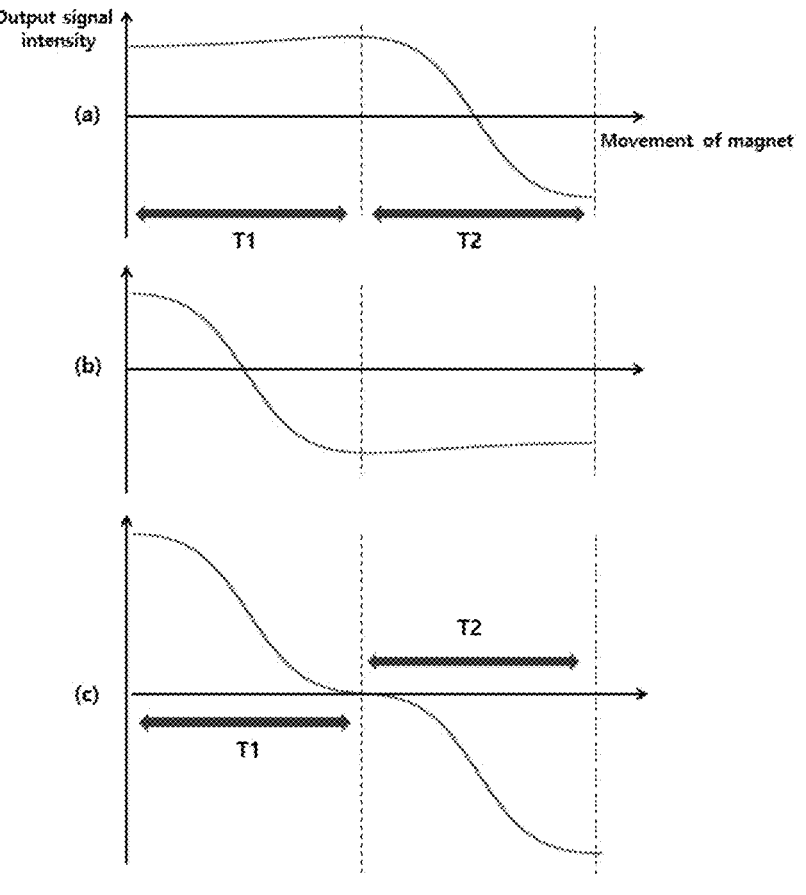
FIG. 8 illustrates the signal system that operates on the output signals from the plurality of Hall sensors.

FIG. 7 illustrates the positional relationship between the plurality of Hall sensors and the magnet in accordance with the present invention, and FIG. 8 illustrates the output signals from the plurality of Hall sensors and the resultant signaling system from their computation.

Hereinafter, the invention will be described based on an embodiment comprising a first magnet (M1) as well as a first (140A-1) and second Hall sensors (140A-2) for detecting the position of the first magnet (M1). It would be obvious, however, that such description would apply the same to an embodiment comprising a second magnet (M2) as well as a third (140B-1) and fourth Hall sensors (140B-2) for detecting the position of the second magnet (M2).

As known well in the art, a Hall sensor detects the magnitude and direction of the magnetic field from a magnet it faces and outputs a proportional electric signal based on the Hall effect.

This means that the variation in the output signal of a Hall sensor in response to a moving magnet would be small when the Hall sensor is placed in the middle portion of a certain magnetic pole (N or S) whereas the variation would be large when the Hall sensor is placed at the interpolar boundary of the magnet.

Meanwhile in such applications as high magnification zoom involving extended movements of the carriers, the same extension in movements apply to magnets attached to those carriers so that a Hall sensor installed at a fixed location comes to face the entire region of the magnet in motion, including the middle portions as well as the boundaries of the magnetic poles.

Therefore, depending on the movement range and position of the magnet (carrier), detecting the exact position of the magnet becomes attainable in a certain range where there is a clear difference in signal values, but unattainable in other ranges where the differences are not as clear. When detecting the exact position of the magnet thus becomes unattainable, precise positional control for zoom or autofocusing becomes unattainable as well.

To effectively address this problem, the present invention comprises Hall sensors to detect the position of the first magnet (M1) as shown in FIG. 7, more specifically, a plurality of Hall sensors disposed along the optical axis at positions differing in their distances displaced from the magnetic pole boundaries (A1 and A2 of FIG. 7) of the first magnet (M1).

In addition, the first operating driver (150A) of the present invention is configured to generate, by means of the collective output signals from this plurality of Hall sensors, the position information of the first magnet (M1) and to control driving of the first carrier (120) based on this information.

Although in the accompanying figures two Hall sensors, a first (140A-1) and a second Hall sensor (140A-2) are representative for the plurality of Hall sensors, this is only one of the possible examples. Needless to say, further numbers Hall sensors can be comprised depending on the particular embodiment.

More specifically, the Hall sensors are configured so that the second Hall sensor (140A-2), as shown in the middle plan view of FIG. 7, is placed at a position (S1) close to the interpolar boundary (A1) and the first Hall sensor (140A-1) is placed at a position (S2) further than that of the second Hall sensor (140A-2) from the same interpolar boundary (A1).

To implement precise processing of the collective output signals from the first (140A-1) and second (140A-2) Hall sensors, the first (140A-1) and second (140A-2) Hall sensors are aligned parallel to the optical axis and placed either anterior or posterior with each other.

The output signals from the first (140A-1) and second Hall sensor (140A-2) upon movement of the first magnet (M1) are respectively shown in FIGS. 8(*a*) and 8(*b*) under the premise that the default position for zoom or autofocusing driving is as shown in FIG. 7 and that the first magnet (M1) moves in an increasing direction along the Z-axis when the zoom or autofocusing is driven by the first operating driver (150A).

When the first magnet (M1) begins to move along in the increasing direction of the Z-axis, there is small change in signal that the first Hall sensor (140A-1) detects in region T1 since the first Hall sensor (140A-1) faces the middle portion in the magnetic pole (N) of the first magnet (M1). The second Hall sensor (140A-2), however, since it is placed close to the interpolar boundary (A1) of the first magnet (M1), detects in region T1, a large change in signal.

Meanwhile, upon continued movement by the first magnet (M1) along the increasing Z-axis, the situation reverses and the first Hall sensor (140A-1) gets closer to the interpolar boundary (A1) while the second Hall sensor (140A-2) moves away from the interpolar boundary (A1) and faces the middle portion of the other, closer pole (S). Accordingly, in relative terms, the change in signal in region T2 becomes more noticeable for the first Hall sensor (140A-1), but lessened for the second Hall sensor (140A-2).

Consequently, accurate location of the first magnet (M1) across the entire stroke range is attainable by configuring the zoom actuator to determine the position of the first magnet (M1) by referring to the output signal from the second Hall sensor (140A-2) for region T1 and the output signal from the first Hall sensor (140A-1) for region T2.

Moreover, further efficiency in data processing can be obtained from doing away with supplementary steps e.g., compartmentalizing the region, either physically or by means of electrical signals, by configuring the electric circuitry or implementing a driving mechanism so as to carry out (additive or subtractive etc.) operations on the output signals from the first (140A-1) and second Hall sensor (140A-2) as shown in FIG. 8(*c*).

The one depicted in the bottom of FIG. 7 is equivalent to an embodiment in which the first Hall sensor (140A-1) is displaced from the first interpolar boundary (A1) by S1 while the second Hall sensor (140A-2) is displaced from the second interpolar boundary (A2) by S2 (S2>S1).

In such arrangement where each Hall sensor is displaced from its individual interpolar boundary by different distances, the output signals from the Hall sensors differ only in their signs (positive or negative), but in terms of magnitude mirror those of the aforementioned examples, leading to the embodiment of the same inventive idea described hereinbefore.

Therefore, the present invention is intended to encompass any embodiment to the extent that a first Hall sensor (140A-1) and a second Hall sensor (140A-2) are configured therein to be displaced from the magnetic pole boundaries (A1, A2) by differing lengths and should not be construed as limited to the examples illustrated in FIG. 7.

In certain embodiments, the first magnet (M1) is configured to have m magnetic poles facing the first coil unit (C1) while the plurality of Hall sensors, i.e., the first (140A-1) and second Hall sensor (140A-2) are configured to be placed facing the same magnetic pole out of said m magnetic poles when the first carrier (120) is in the default position. m here is a natural number equal to or greater than 3.

In this embodiment, the first coil unit (C1) which faces the first magnet (M1) can also be configured as dual subcoils, that is, a first (C1-1) and second subcoil (C1-2).

Such dual subcoil arrangement leads to enhanced driving efficiency in which the first magnet (M1) can be enlarged in response to the extended stroke of the first carrier (120) and driving force is available from utilizing the mutual relation between the first (C1-1) and second subcoil (C1-2) that respectively face different magnetic poles.

Moreover, further efficiency in position detection and feedback position control therefrom is attainable by doing away with such steps as setting the default position for the first carrier (120) when controlling the device based on the output signals from the first (140A-1) and second Hall sensor (140A-2) because the same magnetic pole of the first magnet (M1) is faced together by these two Hall sensors when the first carrier (120) is placed at the default position.

Figure 9:
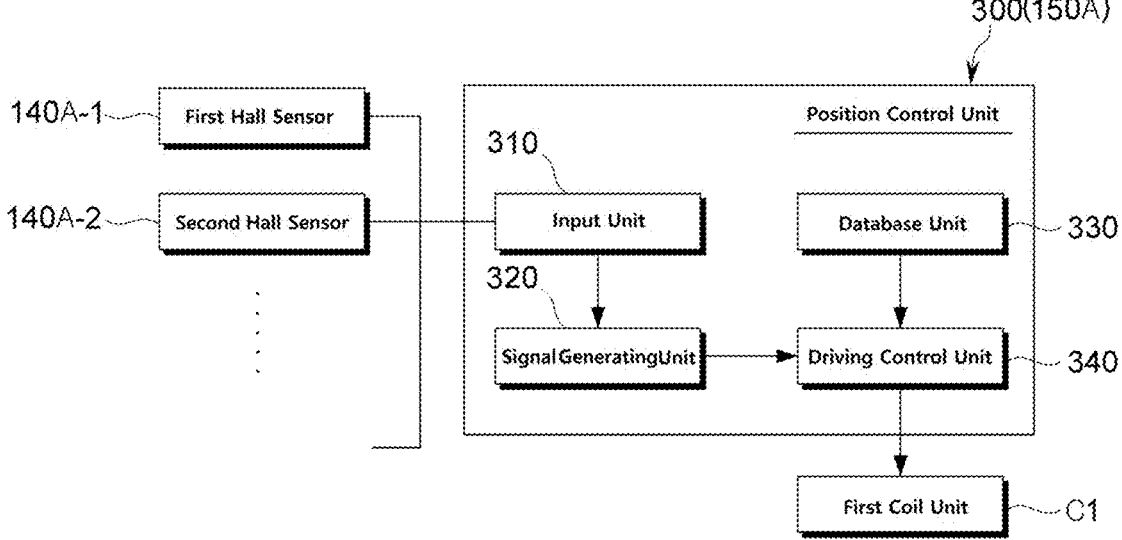
FIG. 9 is a block diagram illustrating the detailed configuration for a positional control unit according to an embodiment of the present invention.
Figure 10:
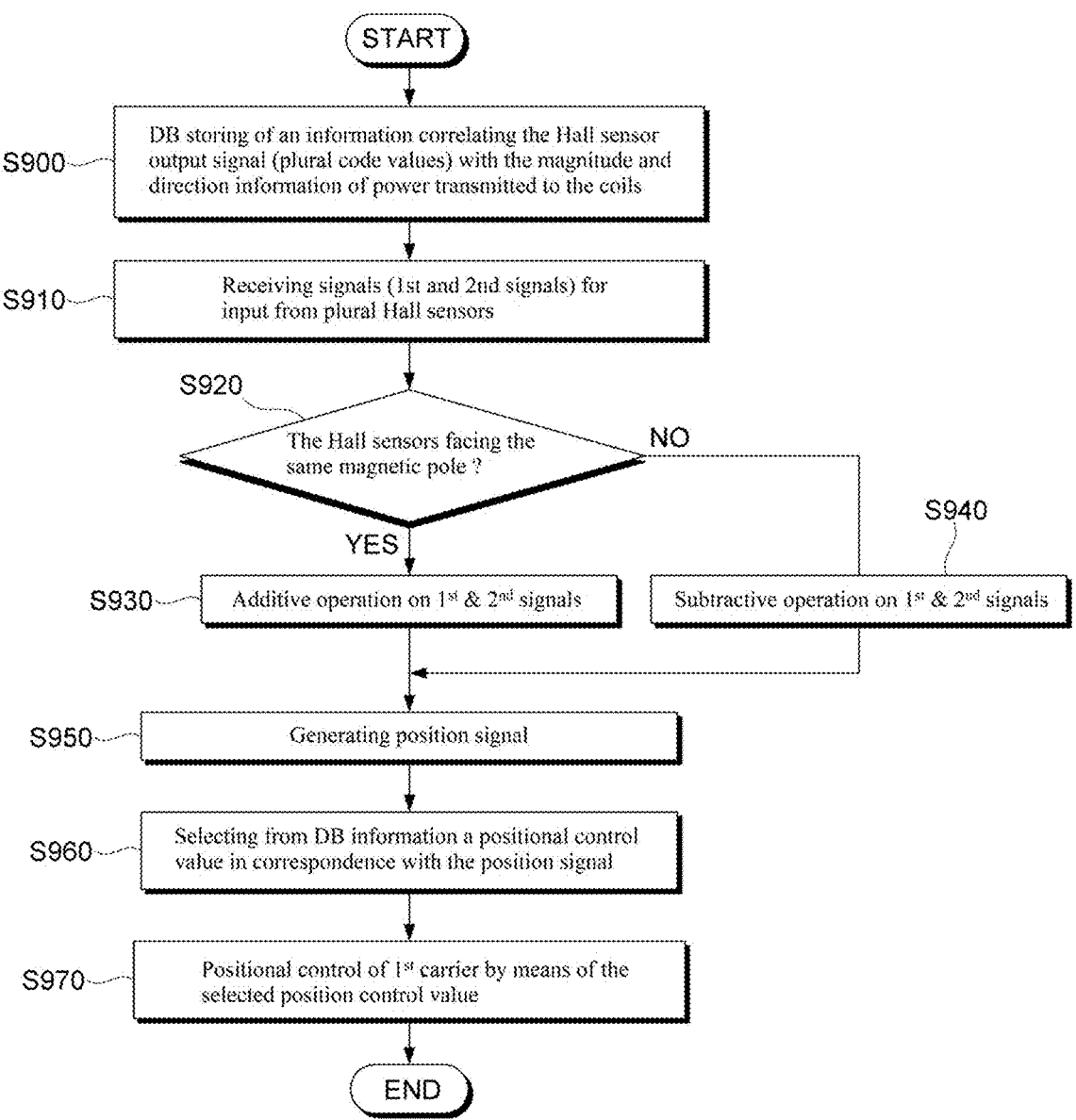
FIG. 10 is a flow chart describing the position control method for zoom driving which is conducted by the positional control unit of the present invention.

FIG. 9 is a block diagram illustrating the detailed configuration for a positional control unit (300) according to an embodiment of the present invention, and FIG. 10 is a flow chart describing the position control method for zoom driving conducted by the positional control unit (300) of the present invention.

The examples illustrated earlier could be described as embodiments for an actuator driving a first (120) and a second carrier (130) along the optical axis, whereas the following description applies to a positional control unit (300) of the present invention, a device installable on an actuator and implementable, in certain embodiments, in the form of the first (150A) or second operating driver (150B) as explained before.

The elements as illustrated in FIG. 9 of the positional control unit (300) according to the present invention should be understood as elements individually set apart by logic rather than physically.

In other words, each embodiment amounts to a logic component for realizing the technical idea of the present invention and any embodiment, regardless of being integral or consisting of separate elements, that is capable of implementing the functions carried out by the logical setup of the present invention should be regarded as being within the scope of the present invention. Any element carrying out a function that is the same as or similar to that of the present invention, should also be construed as being within the scope of the present invention regardless of the agreement in its name.

As shown in FIG. 9, the positional control unit (300) of the present invention may include an input unit (310), a signal generating unit (320), a database (DB) unit (330), and a driving control unit (340).

As described above, the input unit (310) corresponds to an interface for receiving signals (S910) from a plurality of Hall sensors, an exemplary setup being the first Hall sensor (140A-1) and the second hall sensor (140A-2).

As shown in the figures, in certain embodiments, the input unit (310) of the present invention may be configured to receive signals (S910) from a plurality of Hall sensors (140A-1, 140A-2, . . . ) placed to face the first magnet (M1), in which case the positional control unit (300) of the present invention may be configured to generate a position signal of the first carrier (120) by using all of the plurality of signals or a combination of selected signals.

As would be obvious, the following description on positional control of the first carrier (120) in reference to the first magnet (M1), the first coil unit (C1) and the first (140A-1) as well as the second Hall sensor (140A-2) for detecting the first magnet (M1) applies to the positional control of the second carrier (130) in reference to the second magnet (M2), the second coil unit (C2) and the third (140B-1) as well as the fourth Hall sensor (140B-2) for detecting the second magnet (M2).

When an output signal (a first signal) from the first Hall sensor (140A-1) and an output signal (a second signal) from the second Hall sensor (140A-2) are received (S910) via interfacing by the input unit (310), the signal generating unit (320) of the present invention generates a position signal (S950) on the current position of the first carrier (120) by carrying out operations on these first and second signals.

More particularly, when the first carrier (120) is placed at the default position and the plurality of Hall sensors (the first (140A-1) and second Hall sensor (140A-2)) are facing together the same magnetic pole from the first magnet (M1), then the position signal is generated (S950) by processing the output signal (the first and second signal) of each Hall sensor based on additive operation (S930).

On the other hand when the first carrier (120) is placed at the default position and the plurality of Hall sensors (the first (140A-1) and second Hall sensor (140A-2)) are facing different magnetic poles from the first magnet (M1), then the position signal is generated (S950) by processing the output signal (the first and second signal) of each Hall sensor based on subtractive operation (S940).

The database (DB) unit (330) of the present invention may store DB information (S900) such as a lookup table that correlates the code value of the electric signal output from each Hall sensor based on specification information for the first Hall sensor (140A-1), the second Hall sensor (140A-2) and the first coil unit (C1-1, C1-2) with the control value information on the magnitude and direction of power transmitted to the first coil unit (C1-1, C1-2).

Processing of the operations on the first and second signals can be implemented by hardware such as circuitry electrically connecting the first (140A-1) and second Hall sensors (140A-2). It would be obvious that depending on the embodiment, the processing can be alternatively implemented through circuit design of or software installed on the first operating driver (150A).

Upon generation of a position signal from the signal generating unit (320), the driving control unit (340) of the present invention accesses and reads information stored in the database unit (330) and selects control value information corresponding to the position signal (S960).

The driving control unit (340) of the present invention, upon selection of the control value information as described above, controls the application of power to the first coil unit (C1, C1-1, C1-2) in a magnitude and direction in correspondence to the control value information so as to control either the position or movement of the first carrier (120) (S970).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

The invention claimed is:

1. A zoom actuator, said zoom actuator comprising:
   a first carrier having a first lens attached thereto and movable along an optical axis;
   a second carrier having a second lens attached thereto, said second carrier being capable of moving anterior or posterior to the first carrier along the optical axis;
   a housing enclosing the first and second carriers;
   a first magnet attached to the first carrier;
   a second magnet attached to the second carrier;
   a first coil unit mounted to the housing and facing the first magnet;
   a second coil unit mounted to the housing and facing the second magnet; and
   a plurality of balls; with at least one of said plurality of balls positioned between the housing and the first carrier; and at least one of said plurality of balls positioned between the housing and the second carrier, and
   wherein the first carrier comprises:
   a first mount equipped with the first lens;
   a first support fitted on the first mount, either left or right thereto; said first support extending longer along the optical axis than the first mount;
   a first rail formed on the first support; and
   a second rail formed on a region of the first mount unfitted with the first support, and
   wherein the second carrier comprises:
   a second mount equipped with the second lens;
   a second support fitted on a side of the second mount, either to the left or right thereof, but opposite the side the first support is fitted thereon, said second support extending longer than the second mount in a direction opposite to the first carrier along the optical axis;
   a third rail formed on the second support; and
   a fourth rail formed on a region of the second mount unfitted with the second support, and
   wherein said plurality of balls are arranged so that a physical support of the first carrier or the second carrier is in a trapezoidal shape.

2. The zoom actuator according to claim 1,
   wherein each of the first to fourth guide rails is aligned parallel to the optical axis, and

wherein the first guide rail is formed on one side of the housing, either to the left or right, and the third guide rail is formed on the other side of the housing devoid of the first guide rail, and wherein the second guide rail is formed on the inner side of the third guide rail, and the fourth guide rail is formed on the inner side of the first guide rail.

3. The zoom actuator according to claim 1

The first carrier or the second carrier is supported in three positions by said plurality of balls.

4. A zoom actuator, said zoom actuator comprising:

a first carrier having a first lens attached thereto and movable along an optical axis;

a second carrier having a second lens attached thereto, said second carrier being capable of moving anterior or posterior to the first carrier along the optical axis;

a housing enclosing the first and second carriers;

a first magnet attached to the first carrier;

a second magnet attached to the second carrier;

a first coil unit mounted to the housing and facing the first magnet;

a second coil unit mounted to the housing and facing the second magnet; and a plurality of balls; with at least one of said plurality of balls positioned between the housing and the first carrier; and at least one of said plurality of balls positioned between the housing and the second carrier, and wherein the first carrier comprises:

a first mount equipped with the first lens;

a first support fitted on the first mount, either left or right thereto; said first support extending longer along the optical axis than the first mount;

a first rail formed on the first support; and a second rail formed on a region of the first mount unfitted with the first support, and wherein the second carrier comprises:

a second mount equipped with the second lens;

a second support fitted on a side of the second mount, either to the left or right thereof, but opposite the side the first support is fitted thereon, said second support extending longer than the second mount in a direction opposite to the first carrier along the optical axis;

a third rail formed on the second support; and a fourth rail formed on a region of the second mount unfitted with the second support, and wherein a length of the first rail is not same to a length of the second rail.

\* \* \* \* \*